(12) United States Patent
Studer

(10) Patent No.: US 8,720,533 B2
(45) Date of Patent: May 13, 2014

(54) HEAT EXCHANGER AND INSTALLATION FOR EXTRACTING HEAT FROM WASTE WATER

(75) Inventor: Urs Studer, Zürich (CH)

(73) Assignee: Lyonnaise des Eaux, Paris la Defense (FR)

( * ) Notice: Subject to any disclaimer, the term of this patent is extended or adjusted under 35 U.S.C. 154(b) by 1730 days.

(21) Appl. No.: 11/587,820

(22) PCT Filed: Apr. 29, 2005

(86) PCT No.: PCT/CH2005/000240
§ 371 (c)(1),
(2), (4) Date: Nov. 17, 2006

(87) PCT Pub. No.: WO2005/106371
PCT Pub. Date: Nov. 10, 2005

(65) Prior Publication Data
US 2007/0163762 A1    Jul. 19, 2007

(30) Foreign Application Priority Data
Apr. 30, 2004    (EP) ..................................... 04405271

(51) Int. Cl.
F28F 19/00    (2006.01)
F28F 13/18    (2006.01)
F24H 3/00    (2006.01)
F16L 9/14    (2006.01)
F16L 9/00    (2006.01)

(52) U.S. Cl.
USPC .......... 165/134.1; 165/47; 165/133; 165/905; 138/103; 138/140; 138/145; 138/146; 138/172

(58) Field of Classification Search
USPC ................... 165/45, 47, 95, 133, 134.1, 905; 138/36, 103, 104, 140, 145, 146, 172
See application file for complete search history.

(56) References Cited

U.S. PATENT DOCUMENTS

| | | | | |
|---|---|---|---|---|
| 2,476,372 A | * | 7/1949 | Heiks | 106/16 |
| 2,687,626 A | * | 8/1954 | Bartlowe | 29/890.035 |
| 3,053,511 A | * | 9/1962 | Godfrey | 165/133 |
| 3,615,744 A | * | 10/1971 | Yokoo et al. | 106/16 |
| 3,703,367 A | * | 11/1972 | Cocks | 420/479 |

(Continued)

FOREIGN PATENT DOCUMENTS

| | | |
|---|---|---|
| DE | 27 42 025 | 11/1978 |
| DE | 85 17 585 | 9/1985 |

(Continued)

OTHER PUBLICATIONS

Patent Abstracts of Japan, 2002 348942 Dec. 4, 2002.

(Continued)

*Primary Examiner* — Ljiljana Ciric
(74) *Attorney, Agent, or Firm* — Hershkovitz & Associates, PLLC; Abraham Hershkovitz

(57) ABSTRACT

A heat exchanger system extracts heat from sewer waste water. Preferably, a first surface is narrow band in an interior surface of a pipe, and the band is preferably oriented transverse to a direction of fluid flow. In the case of a horizontal pipe, the band may be a partial band, and may be limited substantially to a wetted portion of the pipe in order to reduce the size of the band.

8 Claims, 2 Drawing Sheets

(56) References Cited

U.S. PATENT DOCUMENTS

| | | | | |
|---|---|---|---|---|
| 3,713,814 | A | * | 1/1973 | Larsson .................... 420/479 |
| 3,809,155 | A | * | 5/1974 | Anthony et al. ............. 165/133 |
| 3,960,208 | A | * | 6/1976 | Anthony et al. ............. 165/133 |
| 4,171,972 | A | * | 10/1979 | Bates et al. ................... 420/481 |
| 4,283,464 | A | | 8/1981 | Hascoe |
| 4,352,391 | A | * | 10/1982 | Jonsson ..................... 165/47 |
| 4,412,869 | A | * | 11/1983 | Vernam et al. ............... 165/905 |
| 4,452,757 | A | * | 6/1984 | Kawauchi et al. ........... 420/478 |
| 4,531,980 | A | * | 7/1985 | Miura et al. ................. 165/905 |
| 4,574,878 | A | * | 3/1986 | Sugiyama et al. .......... 165/134.1 |
| 4,631,135 | A | * | 12/1986 | Duddridge et al. ......... 165/134.1 |
| 4,674,566 | A | * | 6/1987 | Heine et al. ................. 165/134.1 |
| 4,830,101 | A | * | 5/1989 | Ohara et al. ................. 165/133 |
| 4,907,738 | A | * | 3/1990 | Harris ........................ 237/2 B |
| 4,991,647 | A | * | 2/1991 | Kawabe et al. ............ 165/134.1 |
| 5,014,774 | A | * | 5/1991 | Siak et al. ................... 165/133 |
| 5,042,575 | A | * | 8/1991 | Lindsay .................... 165/134.1 |
| 5,337,574 | A | * | 8/1994 | Dick ............................ 62/89 |
| 5,366,004 | A | * | 11/1994 | Garner et al. ................ 165/133 |
| 5,730,208 | A | | 3/1998 | Barban ....................... 165/45 |
| 5,857,515 | A | * | 1/1999 | Skupien ..................... 165/47 |
| 6,170,564 | B1 | * | 1/2001 | Steele ........................ 165/133 |
| 6,337,129 | B1 | * | 1/2002 | Watanabe et al. ........... 428/328 |
| 6,595,011 | B1 | * | 7/2003 | Forgy ........................ 62/91 |
| 6,705,391 | B1 | * | 3/2004 | Lewin ........................ 165/133 |
| 6,827,091 | B2 | * | 12/2004 | Harrison .................... 165/95 |
| 6,835,307 | B2 | * | 12/2004 | Talbert et al. ............... 165/200 |
| 7,040,108 | B1 | * | 5/2006 | Flammang .................. 62/238.6 |
| 7,640,969 | B2 | * | 1/2010 | Schmitz ...................... 165/133 |
| 2007/0131394 | A1 | * | 6/2007 | Schmitz ...................... 165/133 |
| 2007/0163762 | A1 | * | 7/2007 | Studer ....................... 165/134.1 |
| 2010/0037611 | A1 | * | 2/2010 | Schmitz ...................... 165/133 |

FOREIGN PATENT DOCUMENTS

| | | |
|---|---|---|
| DE | 36 07 207 | 9/1987 |
| DE | 197 19 311 | 12/1997 |
| EP | 1 215 460 | 6/2002 |
| JP | 2002 348942 | 12/2002 |

OTHER PUBLICATIONS

International Preliminary Examination Report and ISR in PCT/CH2005/000240, Aug. 8, 2005.

* cited by examiner

HEAT EXCHANGER AND INSTALLATION FOR EXTRACTING HEAT FROM WASTE WATER

FIELD OF THE INVENTION

The invention concerns heat exchanger systems and installations for extracting waste heat from waste water.

DESCRIPTION OF THE PRIOR ART

Heat exchanger system is of this kind are known, for example, from the German patent document 197 19 311. It has become apparent, that a direct contact of a preferably metallic heat exchanger surface with the waste water is important, in order that an efficiency can be achieved, with which the system is economical. This, however, requires, that this heat exchanger surface on the one hand is designed in such a manner, that it does not get contaminated too rapidly and on the other hand, that it corresponds to the official government requirements, i.e., that it is accessible and that it is capable of being cleaned with conventional cleaning nozzles.

Sewage systems and waste water channels are naturally susceptible to contamination to a high degree. A layer of contamination on the heat exchanger surface of course has a negative effect on the heat transfer.

Particularly disruptive with a view to the heat transfer is the so-called sewer biofilm. This is a bio-film, which covers objects, which are exposed to unclean water for a longer period of time.

It is known, that alloys of certain metals impair the formation of bio-films. It has become manifest in particular, that the tendency for bio-films settling on copper alloys is strongly reduced.

As a material for heat exchangers in sewerage systems or sewers, copper alloys with a sufficient concentration of copper, however, cannot enter into consideration. This is firstly because copper in the waste water as from a certain concentration impairs the operating ability of sewage treatment plants and for this reason it is not permitted as construction material. Secondly, copper is also relatively rapidly eroded away (abrasion). This has a negative effect on the service lifetime of the heat exchangers.

SUMMARY OF THE INVENTION

It is the objective of the invention to provide a heat exchanger system for extracting waste heat from waste water flowing in a sewerage system or in a sewer, in the case of which a reduced tendency for the formation of a sewer biofilm is present. It is furthermore the objective of the invention to provide a corresponding installation.

This objective is achieved by the invention as it is defined in the claims.

In accordance with the present invention, a heat exchanger system comprises at least one surface area made of copper or an alloy containing copper. This surface area preferably makes up solely a small percentage—for example, less than 5% or less than 2%—of the heat exchanger surface area. It is arranged in such a manner, that water flowing over the heat exchanger surface flows over the mentioned surface areas preferably ahead of the heat exchanger surface or at the beginning of the heat exchanger surface.

The invention is based on the insight that the effect of a copper concentration impairing the bio-film on the surface of the sewage system also continues within a certain zone behind the mentioned surfaces. This has been confirmed by measurements.

In accordance with a preferred embodiment, the surface areas are present in the form of at least one interchangeable band extending across the channel in transverse direction. If the length of the complete heat exchanger surface area exceeds a certain value, which depends on the average composition of the waste water, then it is possible, that more than one band is present. For example, it is possible that every 1-5 m a copper band with a width of, e.g., 0.5-5 cm is arranged.

It has also become manifest, that the effect of the copper—possibly on the basis of the commencement of a formation of less effective complexes—diminishes at a certain distance from the surface areas. The small copper content at best remaining in the waste water is harmless for sewage treatment plants. It is smaller than the copper content that is the result of copper gutters, etc. It is also significantly smaller than the maximum copper content according to official regulations. The copper surface also is significantly smaller than the maximum copper area of roofs. In Switzerland, for example, a seepage installation has to be provided, when a copper surface area of 50 $m^2$ is exceeded.

In place of bands, it is also possible that the surface areas comprise other kinds of shapes. For example, they may also be two-dimensional and/or have a width adapted to the volume of waste water flowing over them to be expected locally. Preferably, they are arranged in such a manner, that at least a major proportion of the water trajectories existing in case of a low waste water volume lead across the surface areas. In the case of a flow assumed to be laminar, this in approximation signifies, that the surface areas in a projection along the direction of flow on a contour line amount to at least half a lower section of the contour line.

BRIEF DESCRIPTION OF THE DRAWINGS

In the following, embodiments of the invention are described in detail on the basis of drawings. These drawings illustrate.

DETAILED DESCRIPTION OF THE PREFERRED EMBODIMENTS

Figure 1:
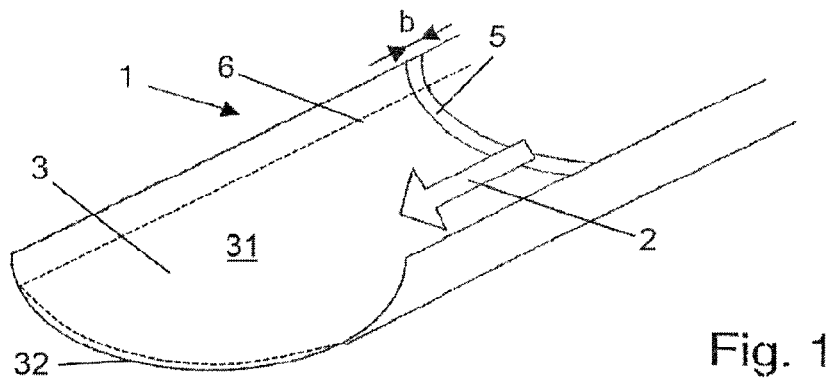
FIG. 1: A schematic view of a lower half of a sewerage pipe, a zone of which is designed as a heat exchanger surface area and which is provided with copper bands as surface areas in accordance with the invention.
Figure 5:
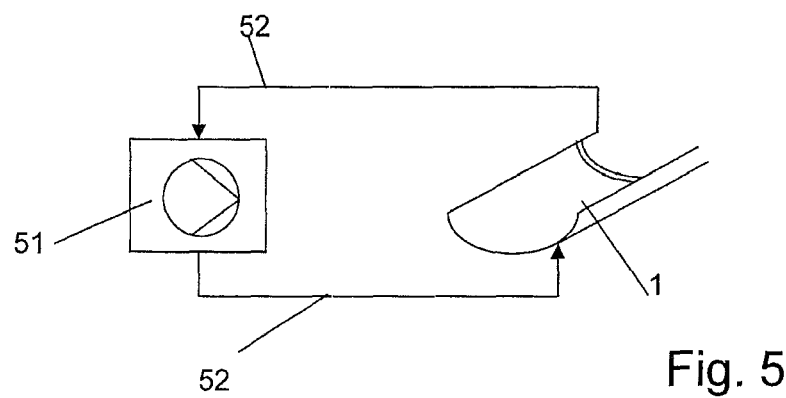
FIG. 5 is a schematic view of heat exchanger system through which a medium flows and circulates between the heat exchanger and a heat pump.

The sewerage pipe 32 illustrated only very schematically in FIG. 1 is flowed through by waste water in the direction of the arrow 2. The sewerage pipe 32 is usually manufactured out of concrete. In one zone, however, a heat exchanger system 1 with at least one heat exchanger element 3 is installed, where the concrete surface is replaced by a usually metallic heat exchanger surface 31 or else is covered by it. Underneath the heat exchanger surface 31, a liquid heat exchanger medium flows, which circulates between the heat exchanger system 1 and a heat pump 51 seen in FIG. 5.

There are various ways of designing heat exchanger systems. For example, it is possible that sewerage pipe segments are replaced in sections by heat exchanger sewerage pipe segments. It is also possible that heat exchangers are installed in a bed of a dry weather channel, placed on the sewerage pipe segments, etc. It is possible that supply pipes for supplying the heat exchangers with the heat exchanger medium are provided inside or outside the sewerage pipes. Frequently the heat exchanger system comprises a row of heat exchanger elements, which are either adjacent to one another or at a distance from one another. Further information concerning certain designs is to be found in the German patent document 197 19 311, to the contents of which express reference is made here with respect to the implementation of installations for extracting heat from waste water. The invention concerns any design of heat exchangers for waste water flowing in a sewerage pipe or—channel.

The measures in accordance with the invention are capable of being utilised in all versions of such heat exchanger systems or in heat exchanger systems still to be developed.

The heat exchanger system 1 according to FIG. 1 is equipped with a copper band 5, which is attached upstream of the heat exchanger surface 31 and which extends over the lower half of the sewerage pipe 32 in transverse direction to the direction of flow. The copper band has a width b of 2 cm and a thickness of between 0.5 mm and 5 mm. It may be installed in an especially provided groove in a heat exchanger element, installed on a heat exchanger element or installed next to a heat exchanger element, or between two heat exchanger elements, respectively.

Figure 2:
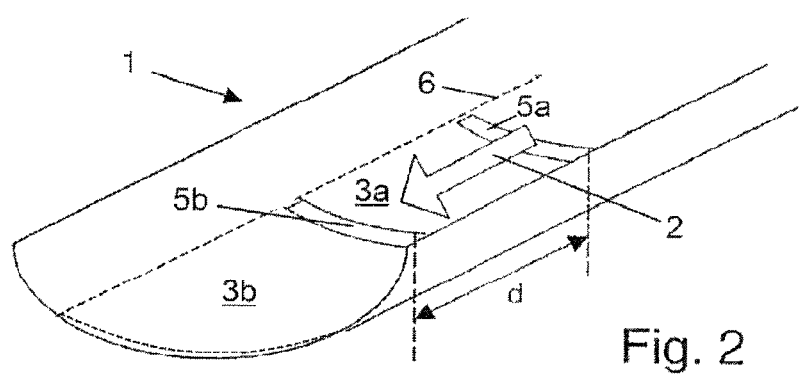
FIG. 2 is a view analogous to that of FIG. 1, wherein the copper bands have a different length.

Illustrated in FIG. 2 is a sewerage pipe with several heat exchanger elements 3a, 3b. In the direction of flow above the first heat exchanger element and between the heat exchanger elements copper bands 5a and 5b are installed. The copper bands, for example are inserted in the space between the mortar filling and the heat exchanger elements. The length of the copper bands in this embodiment is selected in such a manner that it does not extend over the complete lower half of the sewerage pipe. It rather only extends up to a water level line 6, which corresponds to the water level in case of an average waste water flow. On the partial surface area of the heat exchanger surface located at best above this water level line, in any case there will only be a reduced tendency for the deposition of a sewer biofilm, because this partial surface area keeps drying out time and again. In the illustrated embodiment, in every space between two heat exchanger elements a copper band is installed. It goes without saying, that it is also possible that a copper band is installed only between every second, third, etc., heat exchanger element, or that the copper bands are installed both, on as well as between the heat exchanger elements or only on the heat exchanger elements. A water analysis and/or the ph-value of the waste water may be used for the determination of the necessary surface area of the copper.

The distance d between the heat exchanger elements may be selected in dependence of the average composition of the waste water. It has been found that the distance required for the necessary function depends on different factors, in particular on the concentration of metals, such as Ni, Cr, Zn and Cd in the waste water. Typically the optimum distance d between two copper bands amounts to between 1 m and 10 m, and in particular to between 1 m and 5 m. If the complete heat exchanger system is not longer than the required distance, then a single copper band is sufficient.

Preferably the copper bands are installed in such a manner, that they may easily be removed or replaced. This is because one has to assume that their service lifetime is significantly less than the service lifetime of the heat exchanger system and that they therefore, for example, have to be replaced every 3 to 5 years.

In case of a surface contact between a noble metal (for example, copper) and a not noble metal (for example, Cr in stainless steel), it is possible that the not noble metal corrodes more rapidly, when both metals are in contact with water (electrochemical displacement series). For this reason it may be ensured that the copper bands or copper elements with a different shape and the heat exchangers manufactured, for example, out of stainless steel sheet metal do not come into contact. This may be accomplished by providing a silicone coat between the heat exchanger elements and the copper bands. As an alternative, it is possible that the bands, for example, are less wide than the distance between adjacent heat exchanger elements and that they are installed in such a manner, that they do not come into contact with them, but solely with the mortar. Other measures are also conceivable.

Figure 3:
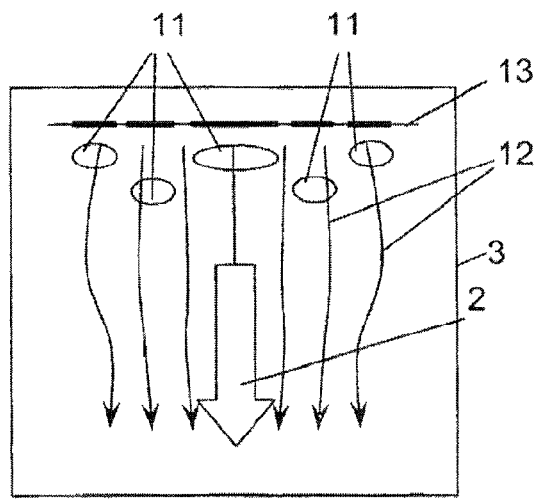
FIG. 3 is a schematic view from above on to a section of a heat exchanger element.

Although for practical reasons it is particularly favourable, if the surface areas made of copper or of a copper alloy are present in the form of bands, this is not at all necessary. In FIG. 3 in a schematic view from above an embodiment is illustrated, in which the surface areas 11 comprise a more or less arbitrarily selected shape. In the case of a mostly laminar waste water flow, the surface area/areas made of copper or of a copper alloy is/are selected in such a manner, that most of the flow trajectories 12 lead over the copper. This leads to the approximate condition, that in the case of a projection on to a contour line 13 along the direction of flow or against the direction of flow, the surface areas make up half of a lower section of the contour line. In the drawing, the schematic projection areas are indicated by boldface lines.

Figure 4:
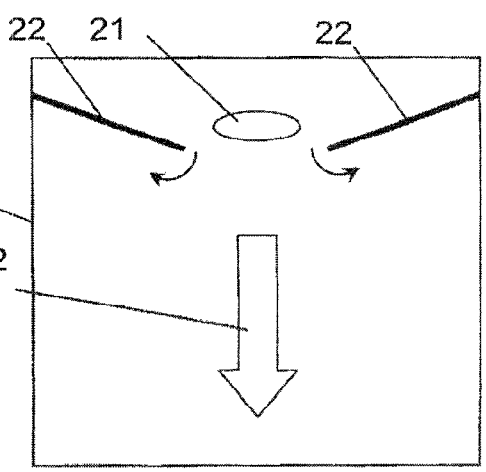
FIG. 4 is a schematic view from above on to a section of a further heat exchanger element.

In case of a turbulent flow, this condition is not applicable, because in that case the waste water is thoroughly mixed as a result of the turbulent motion. The embodiment in accordance with FIG. 4 comprises a surface area 21 made of copper or of a copper alloy and following it a baffle 22 for producing a turbulent motion. In the direction of flow following the baffle 22, a heat exchanger element is installed. On the basis of the turbulent motion it is assured, that following the baffle a major proportion of the waste water comprises a certain copper concentration, which is capable of counteracting the formation of a sewer biofilm.

The invention claimed is:

1. A heat exchanger for extracting heat from flowing sewer waste water, the heat exchanger comprising:
   a first surface made from a first material, the first material comprising a copper concentration impairing a bio-film on the first surface, and said impairing continuing within a zone behind the first surface,
   a second surface made from a second material, the second surface located adjacent to the first surface, and also located in the zone behind the first surface,
   wherein the first surface and the second surface are configured as a first repeating unit having a total length, and
   an additional repeating unit downstream of the first repeating unit.

2. The heat exchanger of claim 1, wherein the first surface is smaller than the second surface.

3. The heat exchanger of claim 2, wherein the first surface is smaller than 5% of the heat exchanger.

4. The heat exchanger of claim 3, wherein the first surface is smaller than 2% of the heat exchanger.

5. The heat exchanger of claim 1, wherein the first surface is located substantially in a region of the heat exchanger which is wetted by the waste water, such that a majority of the first surface is wetted.

6. The heat exchanger of claim 1, wherein:
the first surface is shaped like a band; and
the band is oriented in a transverse direction to a direction of flow of the waste water.

7. The heat exchanger of claim 6, wherein the band is located between two heat exchanger elements.

8. A heat exchanger installation for extracting heat from flowing sewer waste water, the heat exchanger installation comprising:
   a heat exchanger comprising:
      a first surface made from a first material, the first material comprising a copper concentration impairing a bio-film on the first surface, and said impairing continuing within a zone behind the first surface, and
      a second surface made from a second material, the second surface located adjacent to the first surface and also located in the zone behind the first surface,
      wherein the first surface and the second surface are configured as a first repeating unit having a total length,
      an additional repeating unit downstream of the first repeating unit; and a heat pump system comprising a heat exchanger liquid and being configured to extract heat from the flowing sewer waste water via the heat exchanger.

\* \* \* \* \*

UNITED STATES PATENT AND TRADEMARK OFFICE
CERTIFICATE OF CORRECTION

PATENT NO.         : 8,720,533 B2                                        Page 1 of 1
APPLICATION NO. : 11/587820
DATED              : May 13, 2014
INVENTOR(S)        : Urs Studer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1887 days.

Signed and Sealed this

Twenty-ninth Day of September, 2015

Michelle K. Lee
*Director of the United States Patent and Trademark Office*